United States Patent
Yegenoglu

(10) Patent No.: US 7,263,069 B2
(45) Date of Patent: Aug. 28, 2007

(54) ARRANGEMENT FOR EVALUATING NETWORK CAPACITY, NETWORK UTILIZATION, AND NETWORK EFFICIENCY IN A COMMUNICATIONS NETWORK

(75) Inventor: Ferit Yegenoglu, Washington, DC (US)

(73) Assignee: Verizon Business Global LLC, Basking Ridge, NJ (US)

(*) Notice: Subject to any disclaimer, the term of this patent is extended or adjusted under 35 U.S.C. 154(b) by 1044 days.

(21) Appl. No.: 10/188,107

(22) Filed: Jul. 3, 2002

(65) Prior Publication Data

US 2004/0004939 A1   Jan. 8, 2004

(51) Int. Cl.
*H04L 12/28* (2006.01)
(52) U.S. Cl. ..................... 370/254; 370/400
(58) Field of Classification Search ............. None
See application file for complete search history.

(56) References Cited

U.S. PATENT DOCUMENTS

| | | | |
|---|---|---|---|
| 6,795,399 B1 * | 9/2004 | Benmohamed et al. ..... | 370/235 |
| 6,891,795 B1 * | 5/2005 | Hamachi et al. ............ | 370/227 |
| 7,047,316 B2 * | 5/2006 | Iwata et al. ................. | 709/240 |
| 2003/0002444 A1 * | 1/2003 | Shin et al. ................... | 370/238 |
| 2003/0227924 A1 * | 12/2003 | Kodialam et al. ..... | 370/395.21 |

* cited by examiner

*Primary Examiner*—Chau Nguyen
*Assistant Examiner*—Jung Park

(57) ABSTRACT

A network having known network parameters is evaluated based on determined network capacity, utilization, and efficiency attributes relative to different traffic constraints and routing constraints applied to the known network parameters. Each of the network capacity, utilization, and efficiency attributes have prescribed definitions based on the network parameters and relative to the different traffic constraints and routing constraints, and are determined based on linear programming computations of the respective prescribed definitions and the network parameters. The network capacity, utilization, and efficiency attributes can then be applied to computer-based optimization resources configured for determining optimum network parameters for the network.

34 Claims, 4 Drawing Sheets

ARRANGEMENT FOR EVALUATING NETWORK CAPACITY, NETWORK UTILIZATION, AND NETWORK EFFICIENCY IN A COMMUNICATIONS NETWORK

BACKGROUND OF THE INVENTION

1. Field of the Invention

The present invention relates to network design, and traffic analysis including evaluation of a communications network, for example a broadband communications network.

2. Description of the Related Art

Existing communications networks include nodes and circuits, also referred to as links, that interconnect the nodes. Certain nodes may be configured as source/destination nodes configured for introducing/outputting data traffic to/from the network; hence source/destination nodes are considered to "originate" traffic into the network and "sink" traffic from the network. Other nodes are configured as transit nodes (i.e., intermediate nodes) that only can switch traffic, and cannot originate or sink traffic.

An owner of a large scale communications network, for example a backbone network configured for transporting interexchange carrier traffic or wide area network traffic, sells or leases network resources by offering network access to the communications network in terms of a prescribed data rate, for example a prescribed leased bandwidth or a prescribed leased capacity. The sale or lease of network resources based on a prescribed capacity, for example continuous 10 Gigabit per second (Gbps) capacity, requires that the network owner employ network engineering during network deployment to estimate the data-carrying capacity of the large scale communications network.

Network design capacity typically is estimated during design of the network based on selection of hardware components and circuits having prescribed specifications relative to design criteria. For example, network engineers designing a network for deployment will estimate the network capacity based on prescribed specifications of the hardware components used to implement the nodes, and the bandwidth capacity of the circuits interconnecting the nodes. In particular, hardware components such as ATM switches, Ethernet (IEEE 802.3) switches, frame relay switches, microwave repeaters, satellite ground stations, etc. typically will specify their respective capacities (e.g., 100 Mbps ports, 1 Gbps ports, OC-48 SONET ports, etc.). As the hardware components and circuits are installed, typically the hardware components/circuits and their associated attributes (including network capacity attributes specified in the prescribed specifications) are added to a network inventory database, indicating the installed hardware components are available for network service. The installed hardware components/circuits are then provisioned for network service, enabling the installed hardware components/circuits to service network traffic. Hence, network capacity is affected as hardware components/circuits are added to the network.

The capacity of a large scale communications network in transporting network traffic (i.e., network capacity), however, cannot be precisely determined merely by identifying the prescribed capacity specifications of the installed hardware components. In particular, actual network capacity invariably is less than design estimates due to factors associated with deployment of the network. Determining network capacity becomes substantially more complex as the number of circuits and nodes increases in the network, and as network traffic increases. Hence, network owners encounter increasing difficulty in accurately assessing available network capacity for selling or leasing network resources, and for determining whether network expansion is required.

SUMMARY OF THE INVENTION

There is a need for an arrangement that enables a communications network to be evaluated accurately and precisely based on determining network parameters associated with network design, network traffic, and routing constraints.

There also is a need for an arrangement that enables evaluation of network capacity, network utilization, and network efficiency in a communications network.

These and other needs are attained by the present invention, where a network having known network parameters is evaluated based on determined network capacity, utilization, and efficiency attributes relative to different traffic constraints and routing constraints applied to the known network parameters. Each of the network capacity, utilization, and efficiency attributes have prescribed definitions based on the network parameters and relative to the different traffic constraints and routing constraints, and are determined based on linear programming computations of the respective prescribed definitions and the network parameters. The network capacity, utilization, and efficiency attributes can then be applied to computer-based optimization resources configured for determining optimum network parameters for the network.

One aspect of the present invention provides a method of evaluating a network having origination/destination nodes and interconnecting links according to a prescribed network topology. The method includes determining an absolute capacity of the network, having a determined traffic distribution and prescribed routing constraints, based on capacity attributes for the respective links, the absolute capacity identifying a maximum traffic volume that can be carried by the network according to the prescribed network topology, independent of the determined traffic distribution and the prescribed routing constraints. The method also includes determining a second network capacity based on the capacity attributes and the determined traffic distribution between the respective origination/destination nodes, the second network capacity identifying a maximum traffic volume that can be carried by the network according to the prescribed network topology and the determined traffic distribution, independent of the prescribed routing constraints. The determined traffic distribution is evaluated relative to the prescribed network topology based on the absolute capacity and the second network capacity.

An additional feature of this aspect of the present invention involves third determining a third network capacity based on the capacity attributes, the determined traffic distribution and the prescribed routing constraints. The third network capacity identifies a maximum traffic volume that can be carried by the network according to the prescribed network topology, the determined traffic distribution and the prescribed routing constraints. This additional feature also includes including, within the evaluating step, the feature of second evaluating the prescribed routing constraints relative to the prescribed network topology and the determined traffic distribution based on the absolute capacity and the third network capacity.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for evaluating network attributes based on determined network capacity, utilization, and efficiency attributes relative to different traffic constraints and routing constraints applied to the known network parameters. In particular, the disclosed embodiment provides precise definitions for prescribed metrics used to evaluate a network. The prescribed metrics, described below, are determined by utilizing commercially available linear programming and mixed integer programming software resources. Once the prescribed metrics have been determined, the network attributes can be evaluated based on comparing the relative values of the prescribed metrics to determine whether the network is operating at capacity, whether the capacity is being effectively utilized to accommodate additional traffic growth, and whether the capacity is being utilized efficiently.

Moreover, since network performance is based on a combination of network design factors including network topology, traffic distribution within the network, and routing constraints, the prescribed metrics can be successively applied to multiple network design factors in a prescribed hierarchy. Hence, the network design factors can be analyzed to determine whether a network having a prescribed network topology is utilizing an optimum traffic distribution, and whether prescribed routing constraints (e.g., hop count, maximum delay interval, average network delay, etc.) are being utilized efficiently within the prescribed network topology according to a prescribed traffic distribution.

Hence, network engineers can accurately and precisely evaluate network performance based on network topology, network traffic distribution, and identified routing constraints to determine whether reconfiguration of the network is needed to improve efficiency, or increase capacity.

Figure 1A:
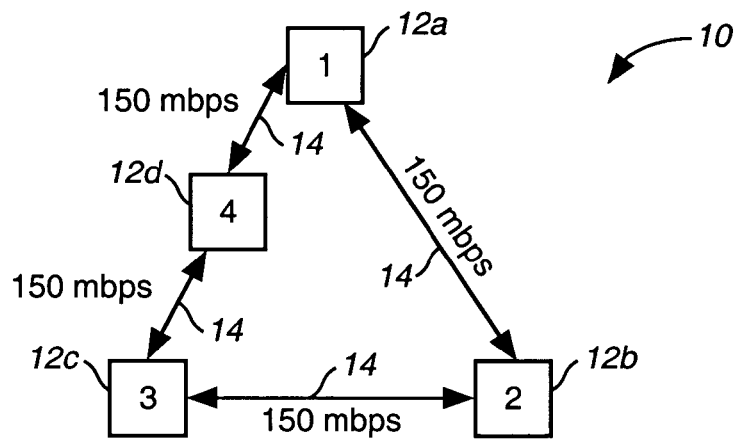
FIGS. 1A, 1B and 1C are diagrams illustrating physical network topology, link capacity, and link traffic, respectively, for a network having nodes and interconnecting links according to a prescribed network topology that can be evaluated according to an embodiment of the present invention.
Figure 1B:
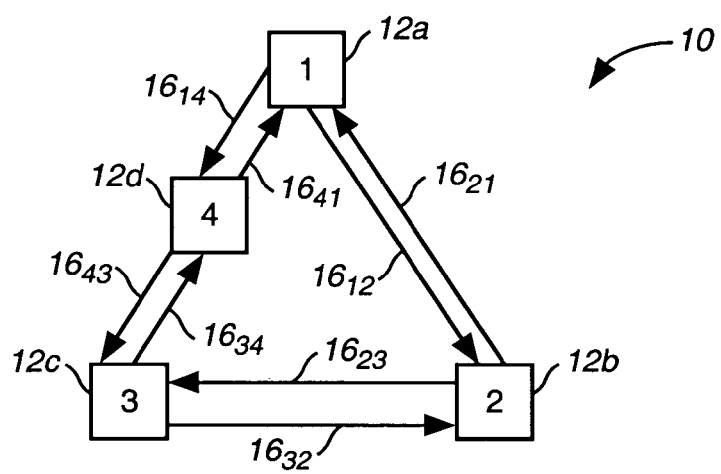
Figure 1C:
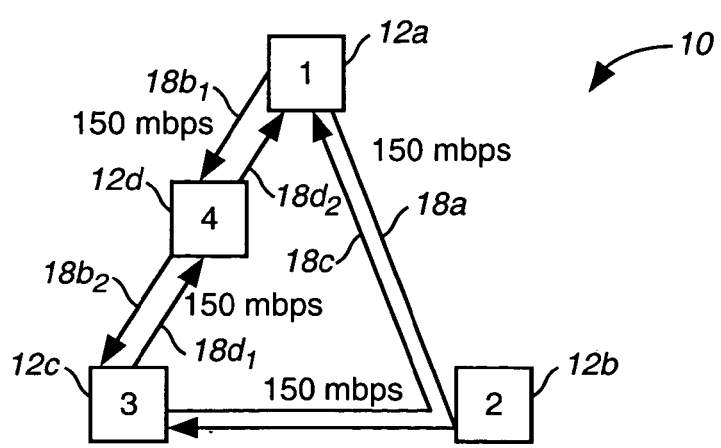

FIGS. 1A, 1B, and 1C are diagrams illustrating different attributes of a network 10 having nodes 12 and links 14 interconnecting the nodes. In particular, FIG. 1A illustrates physical network topology, FIG. 1B illustrates link capacity, and FIG. 1C illustrates link traffic. As illustrated in each of the FIGS. 1A, 1B, and 1C, the network 10 includes nodes 12a, 12b, 12c, and 12d, labeled "1", "2", "3", and "4", respectively. The nodes 12a, 12b, and 12c are deemed origination/destination nodes that can supply or output network traffic into and out from the network 10, and the node 12d is deemed a transit node (i.e., an intermediate node) configured solely before switching network traffic to another network node.

As illustrated in FIG. 1A the nodes 12 are interconnected by interconnecting links 14, illustrated as two-way links having a two-way bandwidth of 150 Mbps. FIG. 1B illustrates in further detail the link traffic configuration, where each of the interconnecting links are composed of 1-way links 16, each illustrated as having a corresponding link capacity of 150 Mbps. Hence, the bidirectional circuits 14 are modeled herein as two unidirectional links 16.

FIG. 1C illustrates the traffic routing, where all traffic is passed between nodes 12a ("1") and 12c ("3"). In particular, the traffic routing includes a traffic component 18a from node 12a to node 12c via node 12b; a traffic component 18b (composed of legs $18b_1$ and $18b_2$) from node 12a to node 12c via node 12d; a traffic component 18c from node 12c to node 12a via node 12b; and a traffic component 18d (composed of legs $18d_1$ and $18d_2$) from node 12a to node 12c via node 12d.

According to the disclosed embodiment, network capacity is defined as the maximum volume of traffic that can enter and leave the network, also referred to as the network's maximum throughput. Network capacity also can be measured in bits per second. In particular, three capacity metrics are used to specify differing types of capacity within the network 10: absolute capacity ($C_A$) of the network 10, capacity ($C_T$) for a given traffic distribution 18, and capacity ($C_{TR}$) for a given traffic distribution and prescribed routing constraints.

Absolute capacity ($C_A$ is defined as the maximum throughput of the network 10 without any routing constraints or traffic distribution constraints. Hence, the only constraints used for absolute capacity is the maximum link utilization constraints, in other words the capacity of the individual links 16 associated with the nodes 12, discounting transit nodes. As illustrated in FIG. 1B, the absolute capacity ($C_A$) can be determined to equal 900 Mbps ($C_A$=900 Mbps) (after discounting transit node 12d) from the following capacity matrix C that specifies the link capacity $C_{ij}$ for each link 16 configured for sending data from source node i to destination node j:

$$C = \begin{bmatrix} 0 & 150 & 0 & 150 \\ 150 & 0 & 150 & 0 \\ 0 & 150 & 0 & 150 \\ 150 & 0 & 150 & 0 \end{bmatrix}$$

The problem of determining the absolute network capacity $C_A$ is equivalent to finding a traffic matrix T with the largest possible sum of entries $T_{ij}$. A formal definition that can be used to determine $C_A$ using linear programming resources is described in the attached Appendix A.

Capacity for a Given Traffic Distribution ($C_T$) is defined as the maximum throughput of a network 10 for a given traffic distribution, where traffic distribution is defined as the relative size of traffic between different origination/destination pairs. As illustrated in FIG. 1C, the capacity for the given traffic distribution ($C_T$), relative to the traffic components 18, can be determined to equal 600 Mbps ($C_T$=600 Mbps) from the following traffic matrix T that specifies the link traffic $T_{kl}$ for each link traffic component 18 from source node k to destination node 1:

$$T = \begin{bmatrix} 0 & 0 & 300 \\ 0 & 0 & 0 \\ 300 & 0 & 0 \end{bmatrix}$$

As described below, the objective in calculating $C_T$ is to determine how much traffic can grow (based on a maximum growth factor $\alpha_{max}$) while conforming to a given traffic distribution without exceeding maximal allowable utilization on any link. For example, the maximum growth factor for the above traffic matrix T is $\alpha_{max}$=1 due to the link capacities, indicating no room for growth. However, if the traffic matrix T was substituted with an alternate traffic matrix T2, then the maximum growth factor $\alpha_{max}$ for the alternate traffic matrix T2 may also differ. Hence, if the alternate traffic matrix T2 for the network 10 includes the traffic components:

$$T2 = \begin{bmatrix} 0 & 100 & 100 \\ 100 & 0 & 100 \\ 100 & 100 & 0 \end{bmatrix},$$

where the one-way traffic components between each of the nodes 12a, 12b, and 12c equal 100 Mbps, then the growth factor $\alpha_{max}$=1.5 based on the capacity matrix C specifying link capacities of 150 Mbps. Hence, the capacity $C_{T2}$ for the traffic distribution T2 would be $C_{T2}$=900 Mbps. Hence, $C_T$ can be determined by:

$$C_T = \sum_{i,j} T', \text{ where } T' = \alpha_{max} T.$$

A formal definition used to determine $C_T$ using linear programming resources is described in the attached Appendix B.

Hence, if the absolute capacity ($C_A$) is greater than the capacity for the given traffic distribution ($C_T$), a network engineer can conclude that the network topology is not a good match for the traffic distribution because $C_T/C_A$, is substantially less than one (i.e., $C_T$ is not substantially equal to $C_A$). In the network 10 illustrated in FIGS. 1A, 1B, and 1C it becomes apparent that the network topology is not a good match to the traffic distribution because all traffic is between nodes 20 12a ("1") and 12c ("3"); in fact, the network design can be improved by removing the node 12b ("2") and adding capacity between the nodes 12a, 12d, and 12c.

An additional capacity metric is capacity for a given traffic distribution and set of routing constraints ($C_{TR}$): the network capacity for a given traffic distribution and routing constraints is defined as the maximum throughput of a network 10 for a given traffic distribution and a set of routing rules. The network capacity for a given traffic distribution and routing constraints ($C_{TR}$) is calculated by determining the amount that traffic can grow while conforming to a given traffic distribution, in accordance with a given set of routing constraints, without exceeding the maximum allowable utilization (i.e., capacity) on any link 16. For example, routing constraints that may be applied to the traffic distribution of FIG. 1C may include that each traffic element in the traffic matrix T is split into two equal components that are routed over disjoint links; another exemplary routing constraint may include requiring the path length to be smaller than a specified value, or requiring multiple paths between the same source/destination nodes that are disjoint.

Hence, three capacity metrics can be used to determine and evaluate traffic distribution and applied routing constraints relative to the network topology: if $C_T$ is substantially equal to $C_A$ such that $C_T/C_A \approx 1$, then there is a good match (i.e., optimization) between the network design and the given traffic distribution; however, if $C_T$ is substantially less than $C_A$ such that $C_T/C_A << 1$, then the network topology is not a good match (i.e., not optimized) for the traffic distribution.

Similarly, the capacity for given traffic distribution and set of routing rules ($C_{TR}$) can be compared with the absolute capacity ($C_A$) to determine whether the prescribed routing constraints are optimized relative to the prescribed network topology: if $C_{TR}$ is substantially equal to $C_A$ such that $C_{TR}/C_T \approx 1$, then there is a good match (i.e., optimization) between the network design and the routing constraints for the given traffic distribution; however, if $C_{TR}$ is substantially less than $C_A$ such that $C_T/C_A << 1$, then the network topology is not a good match (i.e., not optimized) for routing constraints relative to the traffic distribution.

As described below, additional metrics are available to quantify the relative optimization between the network topology, the traffic distribution, and the routing constraints. As described below, the additional metrics include available capacity of a network (AC), network capacity utilization ($\rho$), and capacity utilization efficiency ($\mu$).

Figure 2:
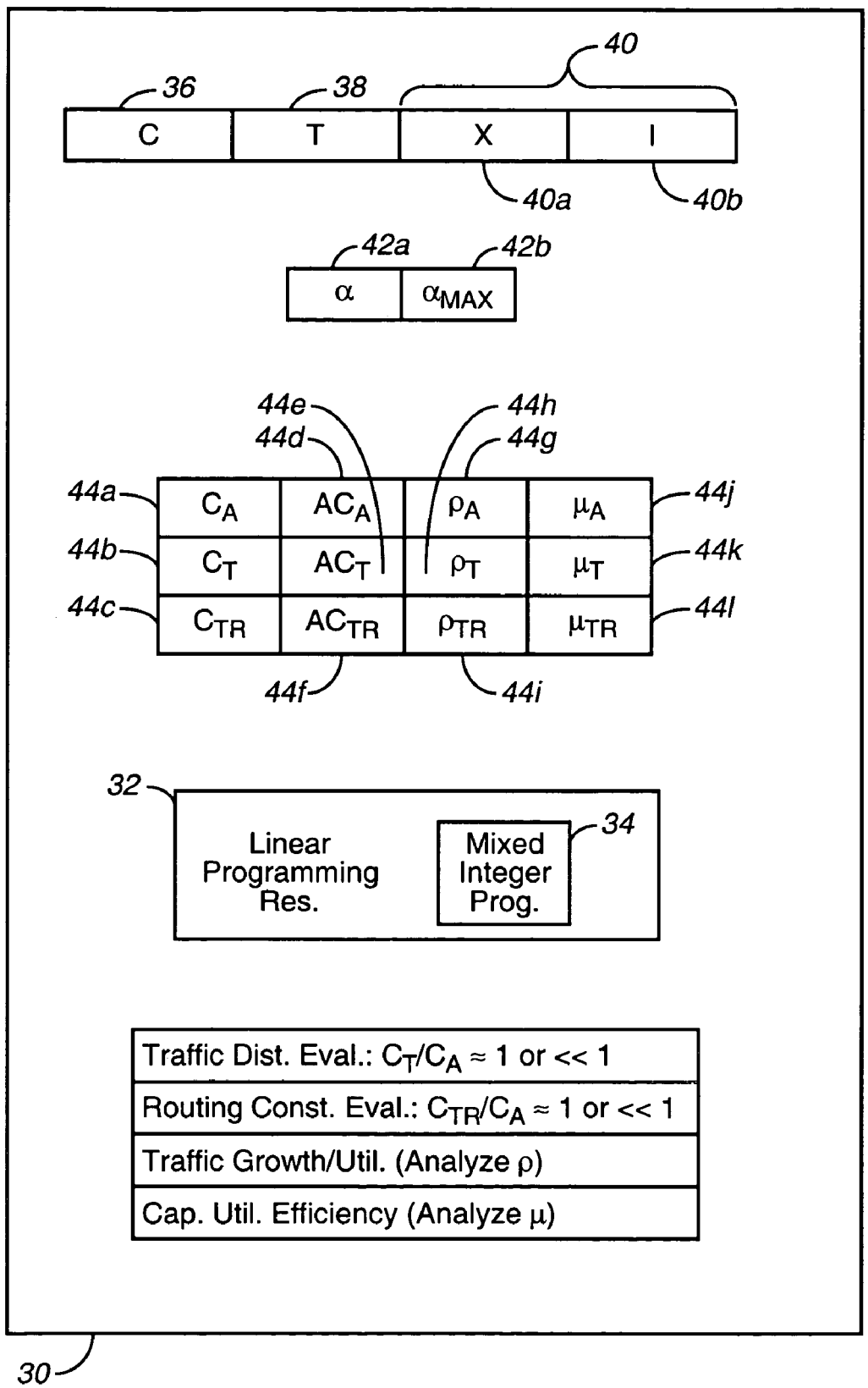
FIG. 2 is a diagram of a computer-based system configured for evaluating the network of FIG. 1 according to an embodiment of the present invention.

FIG. 2 is a diagram illustrating a computer-based system 30 configured for evaluating the network 10 based on determining prescribed network metrics including absolute capacity ($C_A$), capacity for a given traffic distribution ($C_T$), and capacity for a given traffic distribution and prescribed routing constraints ($C_{TR}$), according to an embodiment of the present invention. In particular, the system 30 includes multiple executable resources configured for identifying network attributes, calculating network metrics, and/or evaluating the network attributes and metrics based on linear programming resources.

The system 30 includes commercially available linear programming resources 32 including a mixed integer program resource 34. An example of a commercially available linear programming resource 32 is the ILOG Optimization Suite from ILOG, Inc., Mountain View, Calif. The linear programming resources 32 are configured for minimizing a linear objective function of continuous real variables, subject to linear constraints. As described below, routing constraints may be specified in terms of either binary and/or continuous variables, depending on application, hence the mixed integer program resource 34 is utilized to minimize a linear objective function of continuous real variables and binary variables, subject to linear constraints.

As illustrated in FIG. 2, the system 30 is configured for storing network attributes that may be predetermined based on network topology definitions or determined from measurements over time (e.g., average traffic distribution over one week). In particular, the system 30 includes a capacity resource 36 configured for storing the link capacity matrix C, a traffic resource 38 configured for storing the traffic distribution matrix T, and a routing constraints resource 40 configured for storing identified routing constraints, for example traffic allocation variables (X) 40a, link use indicators (I) 40b, etc. Additional details related to the routing constraints will be described below.

The system 30 also includes resources 42 configured for storing calculated parameters used during linear programming, for example the traffic growth factor ($\alpha$) 42a and the maximum traffic growth factor ($\alpha_{max}$) 42b for the corresponding traffic distribution T. Each of the resources configured for storing values may be implemented in software, using software based registers under control of executable code.

The system 30 also includes resources 44 configured for calculating respective network metrics based on applying the linear programming resources 32 or the mixed integer program resource 34. In particular, the resources 44a, 44b, and 44c are configured for calculating absolute capacity ($C_A$), capacity for a given traffic distribution ($C_T$), and capacity for a given traffic distribution and prescribed routing constraints ($C_{TR}$), respectively. The resources 44d, 44e, and 44f are configured for calculating available absolute capacity ($AC_A$), available capacity for a given traffic distribution ($AC_T$), and available capacity for a given traffic distribution and prescribed routing constraints ($AC_{TR}$), respectively. The available capacity is calculated by using the same methods to calculate total capacity (e.g., $C_A$, $C_T$, $C_{TR}$) after subtracting existing traffic load on each link from the total link capacity.

The resources 44g, 44h, and 44i are configured for calculating network capacity utilization relative to absolute capacity ($\rho_A$=Total traffic carried/$C_A$), network capacity utilization relative to a given traffic distribution ($\rho_T$=Total traffic carried/$C_T$), and network capacity utilization relative to a given traffic distribution and routing constraints ($\rho_{TR}$=Total traffic carried/$C_{TR}$), respectively.

The resources 44j, 44k, and 44l are configured for calculating network capacity utilization efficiency relative to absolute capacity ($\mu_A$=Total traffic carried/($C_A$-$AC_A$)), network capacity utilization efficiency relative to capacity for a given traffic distribution ($\mu_T$=Total traffic carried/($C_T$-$AC_T$)), and network capacity utilization efficiency relative to capacity for a given traffic distribution and prescribed routing constraints ($\mu_{TR}$=Total traffic carried/($C_{TR}$-$AC_{TR}$)), respectively.

Hence, the resources 44 use the linear programming resources calculate the respective metrics based on the linear programming resources 32, where the resources 44c, 44f, 44i, and 44l, configured for calculating the respective metrics based on routing constraints that may be specified in terms of either binary and/or continuous variables, utilize the mixed integer program resource 34 to minimize a linear objective function of continuous real variables and binary variables, subject to linear constraints.

The system 30 also includes evaluation processes 46 configured for providing quantitative analysis of whether a network topology, traffic distribution, and routing constraints are optimized relative to each other. For example, the traffic distribution evaluation process 46a is configured for determining whether the traffic distribution is optimized relative to the prescribed network topology: if $C_T/C_A \approx 1$, then there is optimization between the network topology and the given traffic distribution; however if $C_T/C_A \ll 1$, then the network topology and given traffic distribution are not optimized relative to each other.

The routing constraints evaluation process 46b is configured for determining whether the network topology, the given traffic distribution, and the prescribed set of routing constraints are optimized relative to each other: if $C_{TR}/C_A \approx 1$, then there is optimization between the network topology, the given traffic distribution, and the prescribed routing constraints; however if $C_{TR}/C_A \ll 1$, then the network topology, the given traffic distribution and the routing constraints are not optimized relative to each other.

The traffic growth/utilization evaluation process 46c is configured for identifying whether there is room for traffic growth, and whether the network is being utilized in the best way possible: if $\rho_T \approx 1$ and $\rho_A \ll 1$, there is no room for traffic growth for the given traffic distribution, however the network has not been used in the best way possible (i.e., network topology and traffic distribution have not been optimized relative to each other); if $\rho_T \approx 1$ and $\rho_A \approx 1$, there is a good match between the network design and the given traffic distribution, there is no room for traffic growth, and the network is being utilized in the best way possible (i.e., optimized) for the given traffic distribution. Similarly, if $\rho_{TR} \approx 1$ and $\rho_A \ll 1$, the network is operating at its full capacity for the given traffic distribution and set of routing constraints, however the network is not been used (i.e., not optimized) in the best way possible; if $\rho_{TR} \approx 1$ and $\rho_A \approx 1$, there is a good match between the network design and the given traffic distribution and set of routing rules, there is no room for traffic growth, and the network is being utilized in the best way possible for the given traffic distribution and set of routing constraints.

The capacity utilization efficiency evaluation process 46d is configured for determining the ratio of the volume of traffic carried by the network to the network capacity used to carry the traffic: if $\mu_A < 1$, then the absolute capacity ($C_A$) is not being utilized efficiently; if $\mu_T < 1$, then the capacity ($C_T$) for the determined traffic distribution T is not being utilized efficiently (i.e., the network is using more capacity ($C_T$) than necessary to serve the existing traffic); if $\mu_{TR} < 1$, then the network is using more capacity ($C_{TR}$) than necessary to serve the existing traffic T according to the prescribed routing constraints.

Hence, the evaluation processes 46 enable a network engineer to quantitatively determine whether the traffic distribution T is optimized relative to the prescribed network topology, and whether the prescribed routing constraints are optimized relative to the traffic distribution and the prescribed network topology. In addition, the traffic growth/utilization factors $\rho$ determined by the process 46c enable a network engineer to quantitatively identify whether the network is optimized and whether there is additional room for traffic growth, and the capacity utilization efficiency evaluation process 46d enables the network designer to determine from the capacity utilization efficiency parameters $\mu$ whether the network is being utilized efficiently, or whether capacity is being unnecessarily used to serve the existing traffic.

Figure 3:
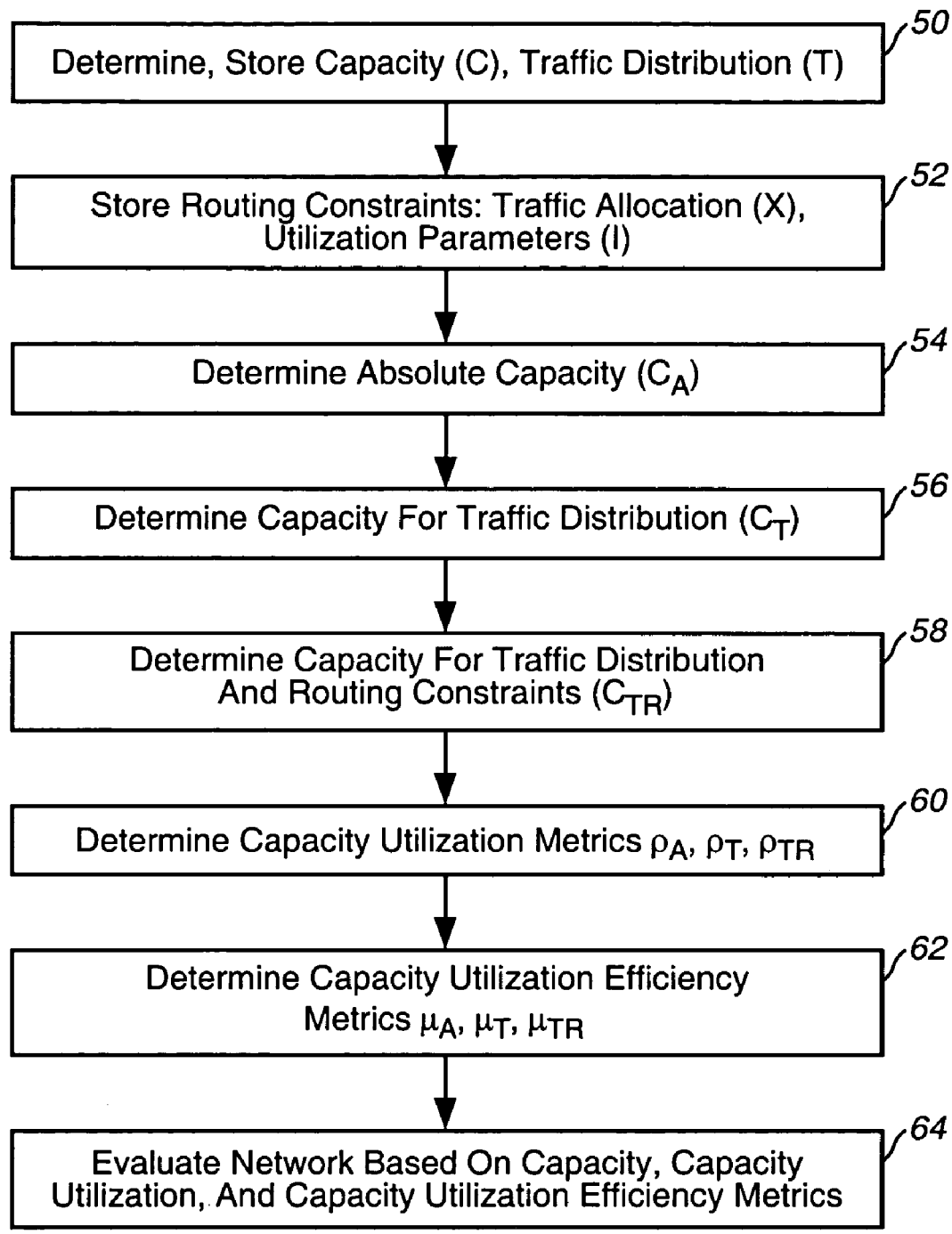
FIG. 3 is a diagram illustrating a method of evaluating the network of FIG. 1 according to an embodiment of the present invention.

FIG. 3 is a diagram illustrating the method of evaluating a network, according to an embodiment of the present invention. The steps described in FIG. 3 can be implemented as executable code that is stored on a computer readable medium (e.g., a hard disk drive, a floppy drive, a random access memory, a read only memory, an EEPROM, a compact disk, etc), or propagated via a computer readable medium (e.g., a transmission wire, an optical fiber, a wireless transmission medium utilizing an electromagnetic carrier wave, etc.).

The method begins in step 50, where the input parameters including capacity (C) and traffic distribution (T) are obtained by the processes 36 and 38, respectively. The capacity matrix C may be stored, for example, by a network engineer during provisioning of the network 10, and the traffic distribution matrix T may be determined, for example, based on traffic measurements over a prescribed time interval (e.g., one week).

The prescribed routing constraints are stored in step 52 by the process 40. In particular, the routing constraints are stored in step 52 in terms of equations involving the traffic allocation variables (X) stored by the process 40a, and the link use variables (I) stored by the process 40b.

The traffic allocation variable X can described as follows: given $T_{k,l}$ as the traffic between source node k and destination l, and $C_{i,j}$ as the capacity of the circuit between node i and node j, then $X_{ijkl}$ is the portion of traffic from node k to node l placed on the circuit between nodes i and j. Hence, a link capacity constraint (used for the capacity definitions) may be written that limits traffic to the link capacity as follows: given the network 10' of FIG. 4 having capacity C and traffic distribution T, where $$C = \begin{bmatrix} 0 & 150 & 0 & 150 & 150 \\ 150 & 0 & 150 & 0 & 150 \\ 0 & 150 & 0 & 150 & 0 \\ 150 & 0 & 150 & 0 & 150 \\ 150 & 150 & 0 & 150 & 0 \end{bmatrix} \text{ and } T = \begin{bmatrix} 0 & 100 & 10 & 20 \\ 10 & 0 & 50 & 30 \\ 10 & 10 & 0 & 20 \\ 100 & 50 & 75 & 0 \end{bmatrix}$$

then limit traffic not to exceed link capacity $C_{15}=150$ Mbps (from node 12e ("1") to node 12i ("5")) based on the constraint:

$$\sum_{k=1}^{4} \sum_{l=1}^{4} X_{15kl} < C_{15} = 150 \text{ Mbps.}$$

In other words, the link 22a from node 12e to node 12i can carry traffic between any of the node pairs, so long as the total traffic between the different source node pairs passing through the link 12i should be less than the link capacity. Similar constraints can be written for all the links.

Routing constraints such as limits on path delay and number of hops along a path can be written in terms of link use indicators $I_{ijklm}$. Link use indicators are defined as follows:

$I_{ijklm}=1$ if traffic k, l, m is using link i,j; 0 if traffic k, l, m is not using link i, j.

Figure 4:
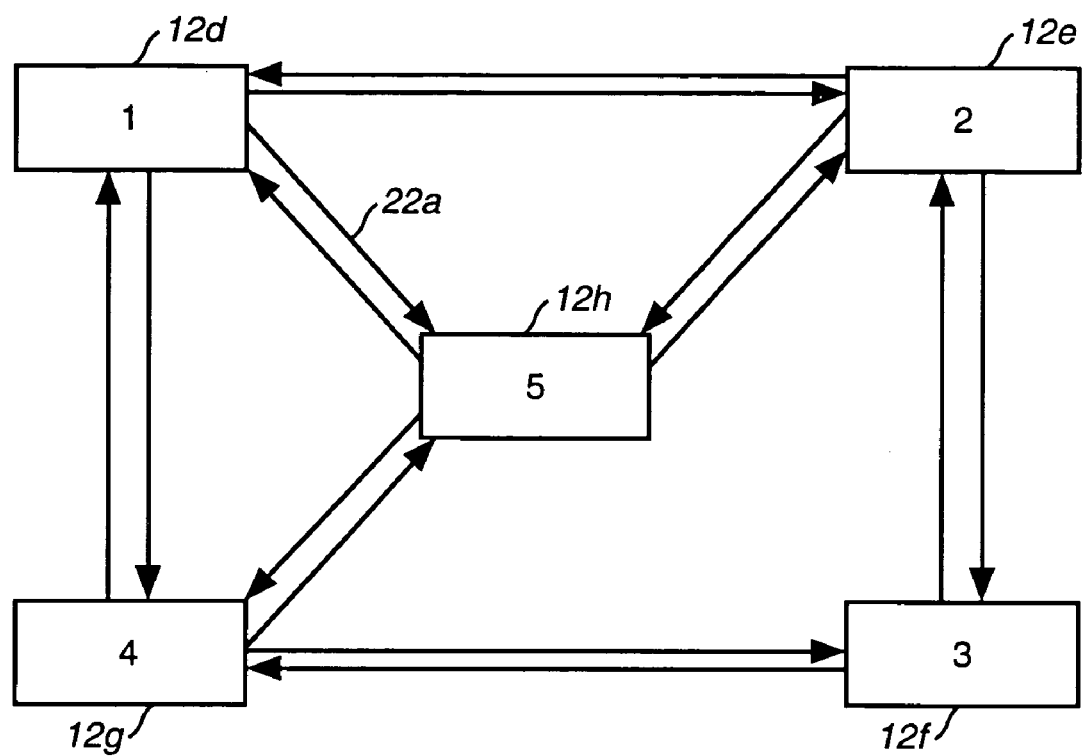
FIG. 4 is a diagram illustrating a second network that can be evaluated according to an embodiment of the present invention.

For example, for the network of FIG. 4, the routing constraint that requires all paths from node 12e ("1") to node 12f ("2") to be less than four (4) links can be written as follows:

$$\sum_{i,j} I_{ijl2m} < 4$$

(i.e., path m from node 1 to node 2 should be less than 4 links where m is the path number).

If only two paths are required (m=1, m=2), then depending on the other constraints, path 1 may go directly from 1 to 2 (nodes 12e and 12f) and path 2 may go through node 5 (nodes 12e, 12i, and 12f). In this case, the link use indicators $I_{12121}$, $I_{15122}$, and $I_{52122}$ would be equal to 1 and all others (e.g., $I_{14121}$, $I_{32121}$, $I_{54122}$) would be equal to 0.

Hence, the required constraints can be written as linear equations involving traffic allocation variables X, or binary use indicators I, or a combination thereof.

Once all constraints have been stored by the resource 40, the absolute capacity computation resource 44a utilizes the linear programming resource 32 to determine in step 54 the absolute network capacity $C_A$. An exemplary formal definition for finding a solution for the absolute network capacity ($C_A$) is illustrated in the attached Appendix A. The capacity computation resource 44b also utilizes the linear programming resource 32 in step 56 to determine the network capacity ($C_T$) for the given traffic distribution T. An exemplary formal definition for finding a solution for the network capacity $C_T$ is illustrated in the attached Appendix B. The capacity computation resource 44c utilizes in step 58 the mixed integer program resource 34 to determine the capacity ($C_{TR}$) for the determined traffic distribution T and the prescribed routing constraints X and I. An exemplary formal definition for finding a solution for the capacity ($C_{TR}$) is illustrated in the attached Appendix C. Available capacity (AC) also is calculated by the resources 44d, 44e, and 44f.

The computation resources 44g, 44h, and 44i generate in step 60 the respective network capacity utilization metrics $\rho_A$, $\rho_T$, and $\rho_{TR}$, respectively, and the computation resources 44j, 44k, and 44l generate in step 62 the respective capacity utilization efficiency metrics $\mu_A$, $\mu_T$ and $\mu_{TR}$, respectively.

Once the network capacity, utilization, and efficiency metrics have been generated by the competition resources 44, the evaluation resources 46 evaluate in step 64 the traffic distribution, routing constraints, traffic growth/utilization, and capacity utilization efficiency, as described above with respect to FIG. 2.

According to the disclosed embodiment, network traffic and performance can be precisely analyzed based on systematic definitions of capacity, utilization, and efficiency metrics under different constraints. The establishment of recognized metrics enables systematic analysis for any network, enabling comparison of different networks, as well as quantifying changes in traffic distribution, routing rules, or network capacity. Finally, the aforementioned metrics can be used effectively to characterize a network and a network state accurately and in a concise manner. The disclosed methodology can be applied to different network technologies, including Internet Protocol networks, ATM networks, frame relay networks, etc.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of evaluating a network having origination/destination nodes and interconnecting links arranged according to a prescribed network topology, the method including:

determining an absolute capacity of the network, based on capacity attributes for the respective links, as a maximum traffic volume that can be carried by the network according to the prescribed network topology independent of traffic distribution of the network and routing constraints of the network;

determining a second network capacity of the network, based on the capacity attributes of the respective links, as a maximum traffic volume that can be carried by the network according to the prescribed network topology and the traffic distribution of the network, independent of the routing constraints; and outputting information to a user, based on the absolute capacity and the second network capacity, that provides an evaluation of the traffic distribution of the network.

2. The method of claim 1, further comprising:

determining a third network capacity based on the capacity attributes, as a maximum traffic volume that can be carried by the network according to the prescribed network topology, the traffic distribution and the routing constraints;

wherein the outputting the information includes outputting second information used to evaluate, based on the absolute capacity and the third network capacity, the routing constraints relative to the network topology and the traffic distribution.

3. The method of claim 2, wherein the outputting the second information further includes identifying whether the routing constraints are optimized relative to the network topology and the traffic distribution, based on whether the third network capacity is substantially equal to the absolute capacity.

4. The method of claim 2, wherein the determining the third network capacity includes applying an executable mixed integer program resource using the capacity attributes, the determined traffic distribution, and the routing constraints to obtain the third network capacity.

5. The method of claim 2, further comprising:

determining a first network capacity utilization relative to the absolute capacity based on the traffic distribution;

determining a third network capacity utilization relative to the third network capacity based on the traffic distribution; and outputting third information, based on the first network capacity utilization and the third network capacity utilization, to evaluate traffic growth availability relative to the prescribed network topology, the traffic distribution and the routing constraints.

6. The method of claim 5, further comprising:

determining a capacity utilization efficiency for at least one of the absolute capacity, the second network capacity, and the third network capacity, based on the traffic distribution.

7. The method of claim 1, wherein the outputting information includes identifying whether the traffic distribution is optimized relative to the network topology based on whether the second network capacity is substantially equal to the absolute capacity.

8. The method of claim 1, wherein:

the determining the absolute capacity includes applying an executable linear programming resource using the capacity attributes to obtain the absolute network capacity; and the determining the second network capacity includes applying the executable linear programming resource using the capacity attributes and the traffic distribution to obtain the second network capacity.

9. The method of claim 1, further comprising:

determining a first network capacity utilization relative to the absolute capacity based on the traffic distribution;

determining a second network capacity utilization relative to the second network capacity based on the traffic distribution; and outputting second information, based on the first network capacity utilization and the second network capacity utilization, to evaluate traffic growth availability relative to the network topology and the traffic distribution.

10. The method of claim 9, further comprising determining a capacity utilization efficiency for at least one of the absolute capacity, and the second network capacity, based on the traffic distribution.

11. A system configured for evaluating a network having origination/destination nodes and interconnecting links arranged according to a prescribed network topology, the system including:

means for determining an absolute capacity of the network, based on capacity attributes for the respective links, as a maximum traffic volume that can be carried by the network according to the prescribed network topology independent of a traffic distribution of the network and the routing constraints of the network;

means for determining a second network capacity of the network based on the capacity attributes of the respective links, as a maximum traffic volume that can be carried by the network according to the prescribed network topology and the traffic distribution of the network, independent of the routing constraints; and means for outputting information to a user, based on the absolute capacity and the second network capacity, that provides an evaluation of the traffic distribution of the network.

12. The system of claim 11, further comprising:

means for determining a third network capacity based on the capacity attributes, as a maximum traffic volume that can be carried by the network according to the prescribed network topology, the traffic distribution and the routing constraints;

wherein the means for outputting the information outputs second information used to evaluate, based on the absolute capacity and the third network capacity, the routing constraints relative to the network topology and the traffic distribution.

13. The system of claim 12, wherein the means for outputting the second information is configured to identify whether the routing constraints are optimized relative to the network topology and the traffic distribution, based on whether the third network capacity is substantially equal to the absolute capacity.

14. The system of claim 12, wherein the means for determining the third network capacity is configured to apply an executable mixed integer program resource using the capacity attributes, the determined traffic distribution, and the routing constraints to obtain the third network capacity.

15. The system of claim 12, further comprising:

means for determining a first network capacity utilization relative to the absolute capacity based on traffic distribution;

means for determining a third network capacity utilization relative to the third network capacity based on the traffic distribution; and means for outputting third information, based on the first network capacity utilization and the third network capacity utilization, to evaluate traffic growth availability relative to the prescribed network topology, the traffic distribution and the routing constraints.

16. The system of claim 15, further comprising means for determining a capacity utilization efficiency for at least one of the absolute capacity, the second network capacity, and the third network capacity, based on the traffic distribution.

17. The system of claim 11, wherein the means for outputting information is configured to identify whether the traffic distribution is optimized relative to the network topology based on whether the second network capacity is substantially equal to the absolute capacity.

18. The system of claim 11, wherein:
the means for determining the absolute capacity is configured to apply an executable linear programming resource using the capacity attributes to obtain the absolute network capacity; and
the means for determining the second network capacity is configured to apply the executable linear programming resource using the capacity attributes to obtain the second network capacity.

19. The system of claim 11, further comprising:
means for determining a first network capacity utilization relative to the absolute capacity based on the traffic distribution;
means for determining a second network capacity utilization relative to the second network capacity based on the traffic distribution; and
means for outputting second information, based on the first network capacity utilization and the second network capacity utilization, to evaluate traffic growth availability relative to the network topology and the traffic distribution.

20. The system of claim 19, further comprising means for determining a capacity utilization efficiency for at least one of the absolute capacity, and the second network capacity, based on the traffic distribution.

21. A computer readable medium having stored thereon sequences of instructions for evaluating a network having origination/destination nodes and interconnecting links arranged according to a prescribed network topology, the sequences of instructions including instructions for:
determining an absolute capacity of the network, based on capacity attributes for the respective links, as a maximum traffic volume that can be carried by the network according to the prescribed network topology independent of traffic distribution of the network and routing constraints of the network;
determining a second network capacity of the network, based on the capacity attributes of the respective links, as a maximum traffic volume that can be carried by the network according to the prescribed network topology and the traffic distribution of the network, independent of the routing constraints; and
outputting information to a user, based on the absolute capacity and the second network capacity, that provides for an evaluation of the traffic distribution of the network.

22. The medium of claim 21, further comprising instructions for:
determining a third network capacity based on the capacity attributes, as a maximum traffic volume that can be carried by the network according to the prescribed network topology, the traffic distribution and the routing constraints;
wherein the outputting the information includes outputting second information used to evaluate, based on the absolute capacity and the third network capacity, the routing constraints relative to the network topology and the traffic distribution.

23. The medium of claim 22, wherein the outputting the second information includes identifying whether the routing constraints are optimized relative to the network topology and the traffic distribution, based on whether the third network capacity is substantially equal to the absolute capacity.

24. The medium of claim 22, wherein the determining the third network capacity includes applying an executable mixed integer program resource using the capacity attributes, the determined traffic distribution, and the routing constraints to obtain the third network capacity.

25. The medium of claim 22, further comprising instructions for:
determining a first network capacity utilization relative to the absolute capacity based on the traffic distribution;
determining a third network capacity utilization relative to the third network capacity based on the traffic distribution; and
outputting third information, based on the first network capacity utilization and the third network capacity utilization, to evaluate traffic growth availability relative to the prescribed network topology, the traffic distribution and the routing constraints.

26. The medium of claim 25, further comprising instructions for determining a capacity utilization efficiency for at least one of the absolute capacity, the second network capacity, and the third network capacity, based on the traffic distribution.

27. The medium of claim 21, wherein the outputting information includes identifying whether the traffic distribution is optimized relative to the network topology based on whether the second network capacity is substantially equal to the absolute capacity.

28. The medium of claim 21, wherein:
determining the absolute capacity includes applying an executable linear programming resource using the capacity attributes to obtain the absolute network capacity; and
determining the second network capacity includes applying the executable linear programming resource using the capacity attributes and the traffic distribution to obtain the second network capacity.

29. The medium of claim 21, further comprising instructions for:
determining a first network capacity utilization relative to the absolute capacity based on the traffic distribution;
determining a second network capacity utilization relative to the second network capacity based on the traffic distribution; and
outputting second information, based on the first network capacity utilization and the second network capacity utilization, to evaluate traffic growth availability relative to the network topology and the traffic distribution.

30. The medium of claim 29, further comprising instructions for:
determining a capacity utilization efficiency for at least one of the absolute capacity, and the second network capacity, based on the traffic distribution.

31. A method of evaluating a network having origination/destination nodes and interconnecting links arranged according to a predetermined network topology, the method including:
determining an absolute capacity of the network based on capacity attributes for the respective links, the absolute capacity identifying a maximum traffic volume that can be carried by the network according to a prescribed network topology of the network;
determining a second network capacity based on the capacity attributes and a determined traffic distribution of the network between the respective origination/ destination nodes, the second network capacity identifying a maximum traffic volume that can be carried by the network according to the prescribed network topology and the determined traffic distribution; and outputting information to a user, based on the absolute capacity and the second network capacity, that provides an evaluation of the determined traffic distribution relative to the prescribed network topology.

32. The method of claim 31, further comprising:

determining a third network capacity based on the capacity attributes, the determined traffic distribution and the prescribed routing constraints, the third network capacity identifying a maximum traffic volume that can be carried by the network according to the prescribed network topology, the determined traffic distribution and the prescribed routing constraints;

wherein the outputting information includes outputting second information used for evaluation of the prescribed routing constraints relative to the prescribed network topology and the determined traffic distribution based on the absolute capacity and the third network capacity.

33. A method of evaluating performance of a network, having origination/destination nodes and interconnecting links arranged according to a prescribed network topology, the method including:

determining an absolute capacity of the network, based on capacity attributes for the respective links, as a maximum traffic volume that can be carried by the network according to the prescribed network topology independent of traffic distribution of the network and routing constraints of the network;

determining a second network capacity of the network, based on the capacity attributes of the respective links as a maximum traffic volume that can be carried by the network according to the prescribed network topology and the traffic distribution, independent of the routing constraints; and outputting information to a user, based on the absolute capacity and the second network capacity, that provides an evaluation of whether the prescribed network topology and the determined traffic distribution are optimized relative to each other within the network.

34. The method of claim 33, further comprising:

determining a third network capacity based on the capacity attributes, as a maximum traffic volume that can be carried by the network according to the prescribed network topology, the traffic distribution and the routing constraints;

wherein the outputting the information includes outputting second information used to evaluate, based on the absolute capacity and the third network capacity, the prescribed routing constraints relative to the prescribed network topology and the determined traffic distribution.

* * * * *